Figure 1:
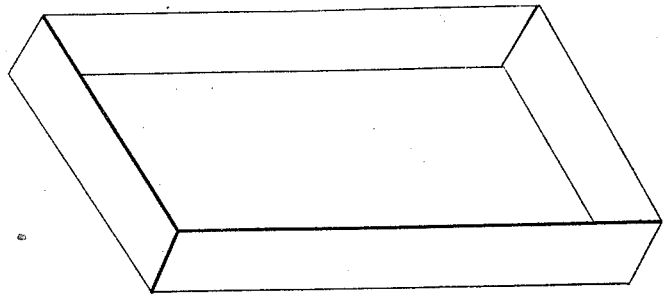
Figure 2:
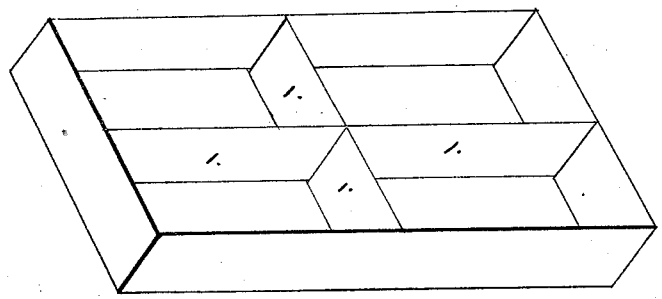
Figure 3:
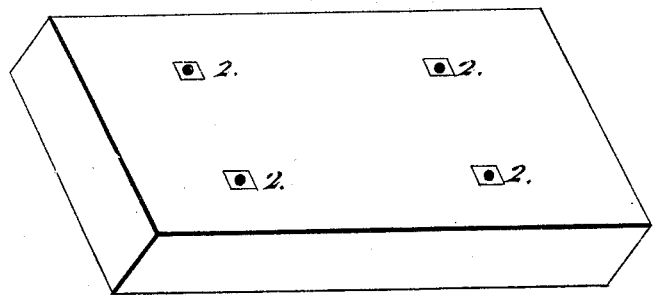

D. Pierce.
Ship Building.

N° 94,510. Patented Sept. 7, 1869.

Witnesses:
Norman Paul
Isaac Churchill

Inventor:
David Pierce.

United States Patent Office.

DAVID PIERCE, OF WOODSTOCK, VERMONT.

Letters Patent No. 94,510, dated September 7, 1869.

IMPROVEMENT IN CONSTRUCTION OF SHIPS.

The Schedule referred to in these Letters Patent and making part of the same.

Be it known that I, DAVID PIERCE, of Woodstock, in the county of Windsor, and State of Vermont, have invented a new and improved Mode of Building Ships and other floating vessels, so as to control and regulate the admission or exclusion of water and air, one or both, into the hold of ships and other floating vessels; and I do hereby declare that the following is a full and exact description thereof, reference being had to the accompanying drawings, making a part of this specification, in which—

Figure I represents an open flat-bottom boat, forty feet long, twenty feet wide, and six feet deep.

Figure II, the same with partitions, one extending at right angles with the keel, the other parallel with it, dividing the space into four equal apartments; the partitions marked 1, 1, 1, 1.

Figure III, the same with the deck in place, covering the entire boat, and forming under it four air-tight apartments, over each of which is a hatchway, perforated in the middle, for a stop-cock, and marked 2, 2, 2, 2.

The nature of my invention consists in providing an air-tight apartment under the lower deck, or making what is usually called the hold in the ship or other floating vessel air-tight from under the lower deck to the bottom of the ship.

To construct the air-tight apartment, the covering or deck should be made convex on the under side, and so strong and unyielding as to resist any pressure which may be brought to bear under the air confined in the air-tight apartment, by a column of water acting under it, of the height of the contemplated draught of water.

The air-tight enclosure should descend from the under part of the deck downward as far as the contemplated draught of water, or to the bottom of the hold, in which a hole through the bottom of the ship may admit the influx of water, or exclude it, to ballast or lighten the ship, as desired, to be controlled by means of a stop-cock or stop-cocks inserted in the deck, connecting with divisions, separating the fore and after portions of the air-tight apartments by a partition, descending from the deck, at right angles to the keel, so far down as to permit water to pass below it, and thus to vary the quantity of water at the fore and after parts of the ship, controlled by the quantity of air admitted by the stop-cocks.

If the ship draw too much water, an injecting-syringe or forcing-air-pump, by injecting, when required, a quantity of air, will expel an equal quantity of water from the hold. In this way, the quantity of water and air in the hold can be regulated and controlled through the medium of the stop-cocks.

A ship so constructed, while the air-tight apartment remains entire, can never be sunk from an accidental leak, for the injected air through the stop-cocks will always control the influx of water above the leak, and below the air-tight apartment. A ship so constructed, and the air-tight apartment remaining entire, would not sink if the bottom were removed.

To enable those skilled in ship-building to build and use my invention, I will proceed further to describe its construction and operation.

The deck, above the air-tight apartment, being made strong and unyielding, as indicated above, and air-tight to the bottom of the hold, must be provided with one or more hatchways, so made as to be capable of being closed air-tight, which may be done in many ways, not necessary to mention. A stop-cock being provided for each division of the apartment, the quantity of water necessary to ballast the ship may always be controlled, and the place it shall occupy beneath the confined air. If the course of the ship be south, and a strong wind blow from the west, air injected on the east side of the keel will accumulate water on the west side, thus shifting the ballast to suit the condition of the ship.

The Creator seems to have indicated the use of the atmospheric pressure, among other purposes, to be applied to secure safety in passing over water, and the manner of its use, in the provision of the air-cell in fishes, to secure their buoyancy. The pressure of the atmosphere is a power always present, and ready to come to the rescue of any sinking ship so constructed as to admit the application and use of that power.

A ferry-boat for the passage of our inland waters, forty feet long, and twenty feet wide, and six feet deep, would, by allowing one thousand ounces to a cubic foot of water, if sunk level with the water, displace four thousand eight hundred cubic feet of water, weighing one hundred and fifty tons. In calm, smooth water, it might float if its burden sunk it to one inch above water-level, but it would be liable to dip water and sink by a very small agitation of the boat. If the boat were reversed, and the same burden were placed on what before was the bottom, but now occupies the place of the deck above the air-tight apartment, it would be free of the inconvenience of water, which generally gathers in the bottom of an open boat. It would also be free of any liability to dip water, and it could not be easily sunk. If it were possible to place upon the boat, now containing four thousand eight hundred cubic feet of air, sufficient burden to depress it sixty feet under water, the volume of elastic air would not be compressed to one-half its former bulk, and, even then, it would have lost no force to resist the pressure of that column of water, but its elastic power would be increased in proportion as the space which confined it was diminished.

If, by accident, a ship have sunk, and the air-tight apartment be filled with water, a tube, connecting a forcing-air-pump, like the apparatus used in the case of a hydrostatic press, with one of the stop-cocks, will by injecting air, expel the water from the divisions. The air is forced under the decks in the same way that water is forced under the piston of a hydrostatic engine, and with sufficient power to expel the water beneath the air in the divisions.

The divisions are formed by two partitions, one passing, at right angles, across the keel, and the other parallel with it, both descending from an air-tight joint with the deck, thus forming four air-tight apartments, but not so near the bottom of the boat as to prevent water from passing under them, over the entire bottom of the boat, while the divisions above would be filled with air. One or more could be filled with water or air, at pleasure, through the medium of the stop-cocks, as the condition of the boat might require. If the boat be "too crank," as sailors say, open the stop-cock in the bottom, and one in the deck. The water, pressing in below, will drive out the air above, and add to the ballast of the boat.

Exclusive of the materials of which the boat is built, it has a capacity of one hundred and fifty tons. If the water rise, through the stop-cock in the bottom, three feet, nearly seventy-five tons will be added to, or operate as ballast to the boat. If the boat draw too much water, a quantity of air pumped through the stop-cocks beneath the deck will exclude a like quantity of water.

Ballast is taken in and discharged in the same way, and may be shifted from fore to aft, and from larboard to starboard, and the reverse.

If the lower half of the boat be filled with water, seventy-five tons may be shifted from fore to aft, or from larboard to starboard, by air forced into different divisions, or suffered to escape, as the condition of the boat might require, at the pleasure of the ship-master.

What I claim as my invention, and desire to secure by Letters Patent, is—

The construction of an air-tight apartment, one or more, next above the water, in place of what is commonly called the hold in ships, to be so made as to admit or exclude water and air, either or both, and control them by means of divisions in the air-tight apartment, so constructed as to admit of being wholly or partially filled with air, by a forcing-air-pump, through stop-cocks inserted through the deck.

DAVID PIERCE.

Witnesses:
NORMAN PAUL,
ISAAC CHURCHILL.